United States Patent
Jeong et al.

(10) Patent No.: US 12,417,780 B2
(45) Date of Patent: Sep. 16, 2025

(54) METHODS OF TRAINING ACOUSTIC SCENE CLASSIFICATION MODEL AND CLASSIFYING ACOUSTIC SCENE AND ELECTRONIC DEVICE FOR PERFORMING THE METHODS

(71) Applicant: Electronics and Telecommunications Research Institute, Daejeon (KR)

(72) Inventors: Young Ho Jeong, Daejeon (KR); Soo Young Park, Daejeon (KR); Minhan Kim, Daegu (KR); Seungjae Baek, Daegu (KR); Seung-Hyeon Shin, Daegu (KR); Seokjin Lee, Daegu (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 388 days.

(21) Appl. No.: 17/987,364

(22) Filed: Nov. 15, 2022

(65) Prior Publication Data

US 2023/0154485 A1 May 18, 2023

(30) Foreign Application Priority Data

Nov. 15, 2021 (KR) .................. 10-2021-0156679

(51) Int. Cl.
*G10L 25/51* (2013.01)
*G06N 5/022* (2023.01)
*G10L 25/27* (2013.01)

(52) U.S. Cl.
CPC .............. *G10L 25/51* (2013.01); *G06N 5/022* (2013.01); *G10L 25/27* (2013.01)

(58) Field of Classification Search
CPC ....... G10L 25/51; H04R 29/00; H04R 29/001; H04R 29/002; G06N 3/08; G06N 20/00; G06N 20/20

(Continued)

(56) References Cited

U.S. PATENT DOCUMENTS

| 10,540,988 B2 | 1/2020 | Lim |
| 2018/0061397 A1 | 3/2018 | Huang et al. |
| 2020/0302949 A1 | 9/2020 | Jeong et al. |

FOREIGN PATENT DOCUMENTS

| KR | 10-2017-0119152 | 10/2017 |
| KR | 10-2018-0117704 | 10/2018 |
| KR | 10-2021-0131067 | 11/2021 |

OTHER PUBLICATIONS

Laine et al."Temporal ensembling for semi-supervised learning", ICLR 2017, Mar. 15, 2017, https://arXiv preprint arXiv: 1610.02242, 2016.

(Continued)

*Primary Examiner* — Ahmad F. Matar
*Assistant Examiner* — Sabrina Diaz
(74) *Attorney, Agent, or Firm* — KILE PARK REED & HOUTTEMAN PLLC

(57) ABSTRACT

Disclosed are methods of training an acoustic scene classification model and classifying an acoustic scene and an electronic device for performing the methods. The training method of an acoustic scene classification model includes inputting training data labeled as an acoustic scene to the acoustic scene classification model that is repeatedly trained by using the training data and outputting a first result predicting the acoustic scene, updating the weight of the auxiliary model configured to induce training of the acoustic scene classification model, based on a weight of the acoustic scene classification model and a weight of an auxiliary model in a previous epoch, inputting the training data to the (Continued)

auxiliary model and outputting a second result, calculating a cost function, based on the first result, the second result, and labeling of acoustic data, and updating the weight of the acoustic scene classification model, based on the cost function.

16 Claims, 5 Drawing Sheets

(58) Field of Classification Search
USPC .......................................................... 381/56
See application file for complete search history.

(56) References Cited

OTHER PUBLICATIONS

Tarvainen et al. Mean teachers are better role models: Weight-averaged consistency targets improve semi-supervised deep learning results., Advances in neural information processing systems, 2017.

METHODS OF TRAINING ACOUSTIC SCENE CLASSIFICATION MODEL AND CLASSIFYING ACOUSTIC SCENE AND ELECTRONIC DEVICE FOR PERFORMING THE METHODS

CROSS-REFERENCE TO RELATED APPLICATION(S)

This application claims the priority benefit of Korean Patent Application No. 10-2021-0156679 filed on Nov. 15, 2021, in the Korean Intellectual Property Office, the disclosure of which is incorporated herein by reference for all purposes.

BACKGROUND

1. Field

One or more example embodiments relate to methods of training an acoustic scene classification model and classifying an acoustic scene and an electronic device for performing the methods.

2. Description of Related Art

Some techniques have been developed to improve the performance of an artificial neural network-based system. For example, a model-ensemble technique is used, in which the model-ensemble technique stores models obtained in a neural network training process, independently obtains an inference result of each of the stored models in an inference process, and combines the inference results together.

In the model-ensemble technique, the complexity of a whole inference model increases as the number of models that are combined together increases. In an environment, such as a mobile environment, where the complexity of an inference model is limited, using the model-ensemble technique may not readily improve the performance of the inference model.

SUMMARY

An aspect provides methods of training an acoustic scene classification model and classifying an acoustic scene and an electronic device for performing the methods, which may improve the performance of the acoustic scene classification model through an ensemble effect without increasing the complexity of an inference model in an environment where the complexity of the inference model is limited.

Another aspect provides a training method of an acoustic scene classification model including inputting training data labeled as an acoustic scene to the acoustic scene classification model that is repeatedly trained by using the training data and outputting a first result predicting the acoustic scene, updating the weight of the auxiliary model configured to induce training of the acoustic scene classification model, based on a weight of the acoustic scene classification model and a weight of an auxiliary model in a previous epoch, inputting the training data to the auxiliary model and outputting a second result, calculating a cost function, based on the first result, the second result, and labeling of acoustic data, and updating the weight of the acoustic scene classification model, based on the cost function.

The updating the weight of the auxiliary model may include, based on a reflection ratio of the weight of the acoustic scene classification model and the weight of the auxiliary model in a previous epoch, in which the reflection ratio is determined based on a weight coefficient, updating the weight of the auxiliary model.

The updating the weight of the auxiliary model may include, as the weight coefficient increases, by increasing the reflection ratio of the weight of the acoustic scene classification model and decreasing the reflection ratio of the weight of the auxiliary model in a previous epoch, updating the weight of the auxiliary model.

The updating the weight of the auxiliary model may include, as an epoch increases, increasing the weight coefficient up until the weight coefficient is less than or equal to a set maximum weight coefficient.

The updating the weight of the auxiliary model may include, when an epoch is less than an epoch that is set to train the acoustic scene classification model alone, determining the weight coefficient such that the weight of the auxiliary model is updated based on the weight of the acoustic scene classification model.

The outputting the first result may include adding noise to the training data and inputting the noise-added training data to the acoustic scene classification model.

The calculating the cost function may include calculating a first cost function by using the first result and the labeling of the training data, calculating a second cost function by using the first result and the second result, and multiplying the second cost function by a cost function coefficient and adding the first cost function thereto.

The calculating the cost function may include, when an epoch is less than an epoch that is set to train the acoustic scene classification model alone, determining the cost function coefficient such that the cost function is calculated based on the first cost function.

Another aspect also provides a method of classifying an acoustic scene including identifying acoustic data including the acoustic scene, inputting the acoustic data to an acoustic scene classification model that is trained, and predicting the acoustic scene, in which the acoustic scene classification model is trained by using an auxiliary model configured to induce training of the acoustic scene classification model.

The acoustic scene classification model may be trained by inputting training data labeled as the acoustic scene to the acoustic scene classification model that is repeatedly trained by using the training data and outputting a first result predicting the acoustic scene, updating the auxiliary model, based on a weight of the acoustic scene classification model and a weight of the auxiliary model in a previous epoch, inputting the acoustic data to the auxiliary model and outputting a second result, calculating a cost function, based on the first result, the second result, and labeling of the acoustic data, and updating the weight of the acoustic scene classification model based on the cost function.

Another aspect also provides an electronic device including a processor, in which the processor is configured to identify acoustic data including an acoustic scene, input the acoustic data to an acoustic scene classification model that is trained, and predict the acoustic scene, in which the acoustic scene classification model is trained by using an auxiliary model configured to induce training of the acoustic scene classification model.

The acoustic scene classification model may be trained by inputting training data labeled as the acoustic scene to the acoustic scene classification model that is repeatedly trained by using the training data and outputting a first result predicting the acoustic scene, updating the auxiliary model, based on a weight of the acoustic scene classification model and a weight of the auxiliary model in a previous epoch, inputting the training data to the auxiliary model and outputting a second result, calculating a cost function, based on the first result, the second result, and labeling of the training data, and updating the weight of the acoustic scene classification model, based on the cost function.

The weight of the auxiliary model may be updated based on a reflection ratio of the weight of the acoustic scene classification model and the weight of the auxiliary model in a previous epoch, in which the reflection ratio is determined based on a weight coefficient.

The weight of the auxiliary model may be updated as the weight coefficient increases by increasing the reflection ratio of the weight of the acoustic scene classification model and decreasing the reflection ratio of the weight of the auxiliary model in a previous epoch.

The weight coefficient may increase as an epoch increases up until the weight coefficient is less than or equal to a set maximum weight coefficient.

The weight coefficient, when an epoch is less than an epoch that is set to train the acoustic scene classification model alone, may be determined such that the weight of the auxiliary model is updated based on the weight of the acoustic scene classification model.

The first result may be output by inputting the training data to which noise is added to the acoustic scene classification model.

The cost function may be calculated by calculating a first cost function by using the first result and the labeling of the training data, calculating a second cost function by using the first result and the second result, multiplying the second cost function by a cost function coefficient, and adding the first cost function thereto.

The cost function may be calculated based on the first cost function when an epoch is less than an epoch that is set to train the acoustic scene classification model alone.

According to an aspect, the performance of a neural network-based acoustic scene classification model may be improved without increasing the complexity of an inference model.

According to an aspect, the performance of an acoustic scene classification model may be improved in an environment, such as a mobile environment, where the complexity of a model is limited.

According to an aspect, a method of training a neural network, such as an acoustic scene classification model, by using an auxiliary model may not transform an existing training model. The performance of a model may be improved by applying the method to the model that has been effectively operating.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
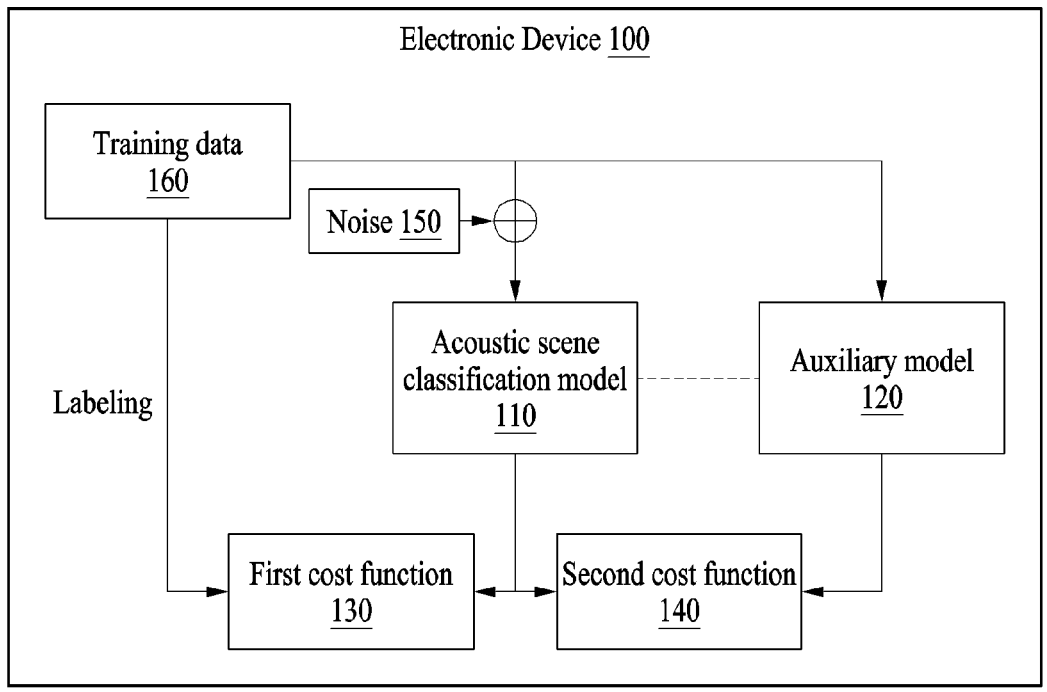
FIG. 1 is a diagram illustrating an operation of training an acoustic scene classification model of an electronic device, according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

FIG. 1 is a diagram illustrating an operation of training an acoustic scene classification model 110 of an electronic device 100, according to an example embodiment.

Referring to FIG. 1, the electronic device 100 may train the acoustic scene classification model 110 by using an auxiliary model 120 for inducing the training of the acoustic scene classification model 110. For example, the acoustic scene classification model 110 may be trained by using an ensemble effect caused by the auxiliary model 120 that is used.

Referring to FIG. 1, the electronic device 100 may input training data 160 labeled as an acoustic scene to the acoustic scene classification model 110 and may output a first result predicting the acoustic scene.

For example, the acoustic scene classification model 110 may be a neural network model, to which various known neural network models may be applied. For example, the neural network model may include a plurality of artificial neural network layers. An artificial neural network may include one of a deep neural network (DNN), a convolutional neural network (CNN), a recurrent neural network (RNN), a restricted Boltzmann machine (RBM), a deep belief network (DBN), and a bidirectional recurrent deep neural network (BRDNN), and a deep Q-network, but examples are not limited thereto. The neural network model may additionally or alternatively include a software structure other than a hardware structure.

For example, the electronic device 100 may add noise 150 to the training data 160 and input the training data 160 to the acoustic scene classification model 110. For example, the electronic device 100 may add the noise 150 to the training data 160 and train the acoustic scene classification model 110 such that each epoch in which the acoustic scene classification model 110 is trained may have variability.

The electronic device 100 may update a weight of the auxiliary model 120, based on a weight of the acoustic scene classification model 110 and a weight of the auxiliary model 120 in a previous epoch. By updating the weight of the auxiliary model 120, based on the weight of the acoustic scene classification model 110 and the weight of the auxiliary model 120 in a previous epoch, the electronic device 100 may train the acoustic scene classification model 110, based on a weighted average of the acoustic scene classification model 110 and the auxiliary model 120.

For example, the weight of the auxiliary model 120 may be updated based on the weight of the acoustic scene classification model 110. For example, the auxiliary model 120 may be a model for inducing the training of the acoustic scene classification model 110. By using the auxiliary model 120, a model for training the acoustic scene classification model 110 may be labeled as an ensemble-inducing model.

For example, the electronic device 100 may update the weight of the auxiliary model 120 to an exponential moving average (EMA) of weights of the acoustic scene classification model 110 or an exponential weighted moving average of the weights of the acoustic scene classification model 110. The EMA and the like for updating the weight of the auxiliary model 120 are only an example, and examples of updating the weight of the auxiliary model 120, based on the weight of the acoustic scene classification model 110, are not limited to the foregoing examples. For example, the electronic device 100 may update the weight of the auxiliary model 120 by using a moving average of the weights of the acoustic scene classification model 110.

Equation 1 below may be an equation for updating the weight of the auxiliary model 120 by the electronic device 100. For example, referring to Equation 1, the electronic device 100 may update the weight of the auxiliary model 120, based on a weight coefficient. For example, based on the weight coefficient, the electronic device 100 may determine a reflection ratio, to the weight of the auxiliary model 120 to be updated, of the weight of the acoustic scene classification model 110 and the weight of the auxiliary model 120 in a previous epoch.

$$\theta_{ema} \leftarrow (1-\alpha)\theta_{ema} + \alpha\theta \quad \text{[Equation 1]}$$

In Equation 1, $\theta_{ema}$ denotes the weight of the auxiliary model 120, $\theta$ denotes the weight of the acoustic scene classification model 110, and $\alpha$ denotes the weight coefficient. In Equation 1, $\theta_{ema}$ on the right may be the weight of the auxiliary model 120 in a previous epoch and $\theta_{ema}$ on the left may be the weight, to be updated, of the auxiliary model 120.

In Equation 1, $(1-\alpha)$ may be a reflection ratio of the weight of the auxiliary model 120 in a previous epoch, and the weight coefficient $\alpha$ may be a reflection ratio of the weight of the acoustic scene classification model 110.

Referring to Equation 1, the electronic device 100 may update the weight of the auxiliary model 120 by increasing the reflection ratio of the weight of the acoustic scene classification model 110 and decreasing the reflection ratio of the weight of the auxiliary model 120 in a previous epoch as the weight coefficient increases. In Equation 1, when the weight coefficient increases, the reflection ratio $(1-\alpha)$ of the weight of the auxiliary model 120 in a previous epoch may decrease and the reflection ratio $\alpha$ of the weight of the acoustic scene classification model 110 may increase.

According to an example embodiment, the weight of the auxiliary model 120 may be updated to the weights of the acoustic scene classification model 110, for example, to an EMA of the weights of the acoustic scene classification model 110 in a previous epoch, and the auxiliary model 120 may be referred to as an EMA model. A weight coefficient may be referred to as a moving average coefficient.

In Equation 1, the weight coefficient $\alpha$ may be a constant for adjusting a valid length of a window function of the weight of the acoustic scene classification model 110. For example, when the weight coefficient $\alpha$ increases, a weight of the acoustic scene classification model 110 in previous epochs may be less reflected in the weight of the auxiliary model 120 than a weight of the acoustic scene classification model 110 in a current epoch, and the weight of the acoustic scene classification model 110 in the current epoch may be more reflected in the weight of the auxiliary model 120 than the weight of the acoustic scene classification model 110 in the previous epochs. As the weight coefficient $\alpha$ increases, the weight of the auxiliary model 120 may more sensitively respond to the weight of the acoustic scene classification model 110 in the current epoch.

In Equation 1, the weight of the auxiliary model 120 may be updated based on the weight of the acoustic scene classification model 110, the weight of the auxiliary model 120 in a previous epoch, and the weight coefficient. In Equation 1, the weight of the auxiliary model 120 may be determined based on the weights of the acoustic scene classification model 110.

For example, in Equation 1, updating the weight of the auxiliary model 120, based on the weight of the acoustic scene classification model 110 and the weight of the auxiliary model 120 in a previous epoch, may be understood to be the same as updating the weight of the auxiliary model 120, based on an EMA of the weights of the acoustic scene classification model 110.

For example, the electronic device 100 may increase a weight coefficient, as an epoch increases, up until the weight coefficient is less than or equal to a set maximum weight coefficient.

$$\alpha = \min\left(1 - \frac{1}{n+1}, \alpha_{max}\right) \quad \text{[Equation 2]}$$

In Equation 2, $\alpha$ denotes a weight coefficient, $\alpha_{max}$ denotes the set maximum weight coefficient, n denotes an epoch, and min (a, b) denotes a smaller value between a and b. In Equation 2, the weight coefficient $\alpha$ may be determined to be a smaller value between $$1 - \frac{1}{n+1}$$

that is determined based on an epoch and the set maximum weight coefficient $\alpha_{max}$.

The electronic device 100 may input the training data 160 to the auxiliary model 120 and output a second result. For example, the second result that is output from the auxiliary model 120 may be practically in the same form as that of the first result, which is about a predicted acoustic scene.

For example, the auxiliary model 120 may be a model for inducing the training of the acoustic scene classification model 110, for example, a model for an ensemble-inducing training of the acoustic scene classification model 110. For example, the auxiliary model 120 may include the same neural network structure as that of the acoustic scene classification model 110.

For example, the auxiliary model 120 may include the same neural network structure as that of the acoustic scene classification model 110 and may include the weight of the auxiliary model 120 that is determined based on the weight of the acoustic scene classification model 110. The electronic device 100 may input the training data 160 to the auxiliary model 120 and may output the second result that is formally the same as the first result.

The electronic device 100 may calculate a cost function by using the first result, the second result, and the labeling of the training data 160.

For example, the electronic device 100 may calculate a first cost function 130 by using the first result and the labeling of the training data 160. For example, the electronic device 100 may calculate a second cost function 140 by using the first result and the second result. For example, the first cost function 130, which is calculated by using a first output of the acoustic scene classification model 110 and the labeling of the training data 160, may be referred to as a classification cost function. For example, the second cost function 140, which is calculated by using the first output of the acoustic scene classification model 110 and a second output, may be referred to as a coherence cost function.

For example, the first cost function 130 may compare a difference between the first result of the acoustic scene classification model 110 and labeling, that is, a correct answer, and the second cost function 140 may compare a difference between the first result of the acoustic scene classification model 110 and the second result of the auxiliary model 120.

For example, the electronic device 100 may calculate a cost function by using a sum of a weight of the first cost function 130 and a weight of the second cost function 140. For example, the electronic device 100 may calculate the cost function by summing up a value of the first cost function 130 multiplied by a cost function coefficient and a value of the second cost function 140 multiplied by a cost function coefficient.

For example, the electronic device 100 may calculate the cost function as Equation 3 below.

$$C(\theta) = C_{class}(\theta) + \beta C_{consist}(\theta) \quad [\text{Equation 3}]$$

In Equation 3, $C(\theta)$ denotes the cost function, $C_{class}(\theta)$ denotes the first cost function 130, $\beta$ denotes the cost function coefficient, and $C_{consist}(\theta)$ denotes the second cost function 140.

The electronic device 100 may update the weight of the acoustic scene classification model 110 by using a cost function. For example, the electronic device 100 may update the weight of the acoustic scene classification model 110 to optimize the cost function.

Figure 2:
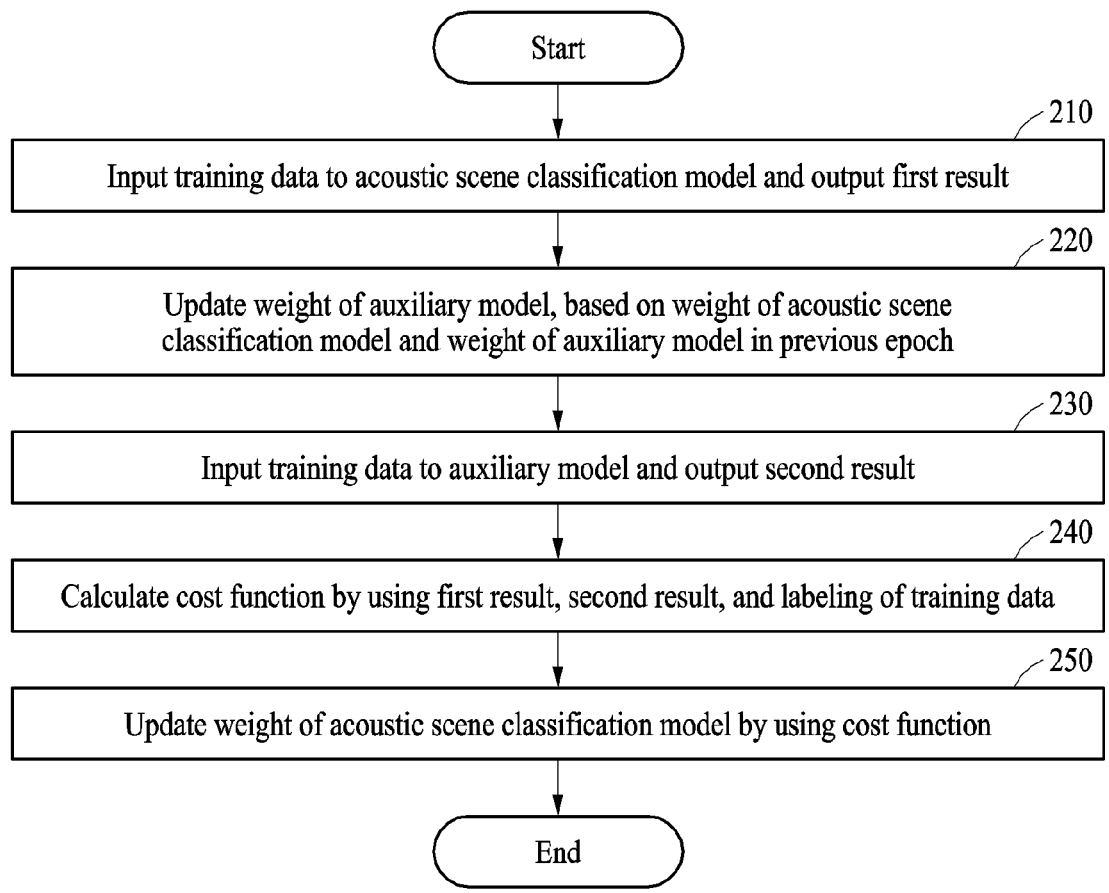
FIG. 2 is a diagram illustrating an operation for a training method of the acoustic scene classification model according to an example embodiment.

FIG. 2 is a diagram illustrating an operation for a training method of the acoustic scene classification model 110 according to an example embodiment.

Referring to FIG. 2, in operation 210, the electronic device 100 may input the training data 160 to the acoustic scene classification model 110 and output a first result. For example, the training data 160 may be acoustic data or an acoustic signal that is labeled as an acoustic scene. For example, the first result may be an acoustic scene predicted by using the training data 160 by the acoustic scene classification model 110 and may be data in a form corresponding to the labeling of the training data 160.

In operation 220, the electronic device 100 may update a weight of the auxiliary model 120, based on a weight of the acoustic scene classification model 110 and a weight of the auxiliary model 120 in a previous epoch.

For example, the weight of the auxiliary model 120 may be updated by using an EMA of weights of the acoustic scene classification model 110 in previous epochs.

In operation 230, the electronic device 100 may input the training data 160 to the auxiliary model 120 and output a second result.

In operation 240, the electronic device 100 may calculate a cost function by using the first result, the second result, and the labeling of the training data 160. For example, the electronic device 100 may calculate the first cost function 130 by using a difference between the first result and the labeling of the training data 160 and may calculate the second cost function 140 by using a difference between the first result and the second result. The electronic device 100 may calculate a cost function by summing up a value of the first cost function 130 multiplied by a cost function coefficient and a value of the second cost function 140 multiplied by a cost function coefficient.

In operation 250, the electronic device 100 may update the weight of the acoustic scene classification model 110 by using a cost function. For example, the electronic device 100 may update a weight of the auxiliary model 120 in a next epoch by using the updated weight of the acoustic scene classification model 110.

Figure 3:
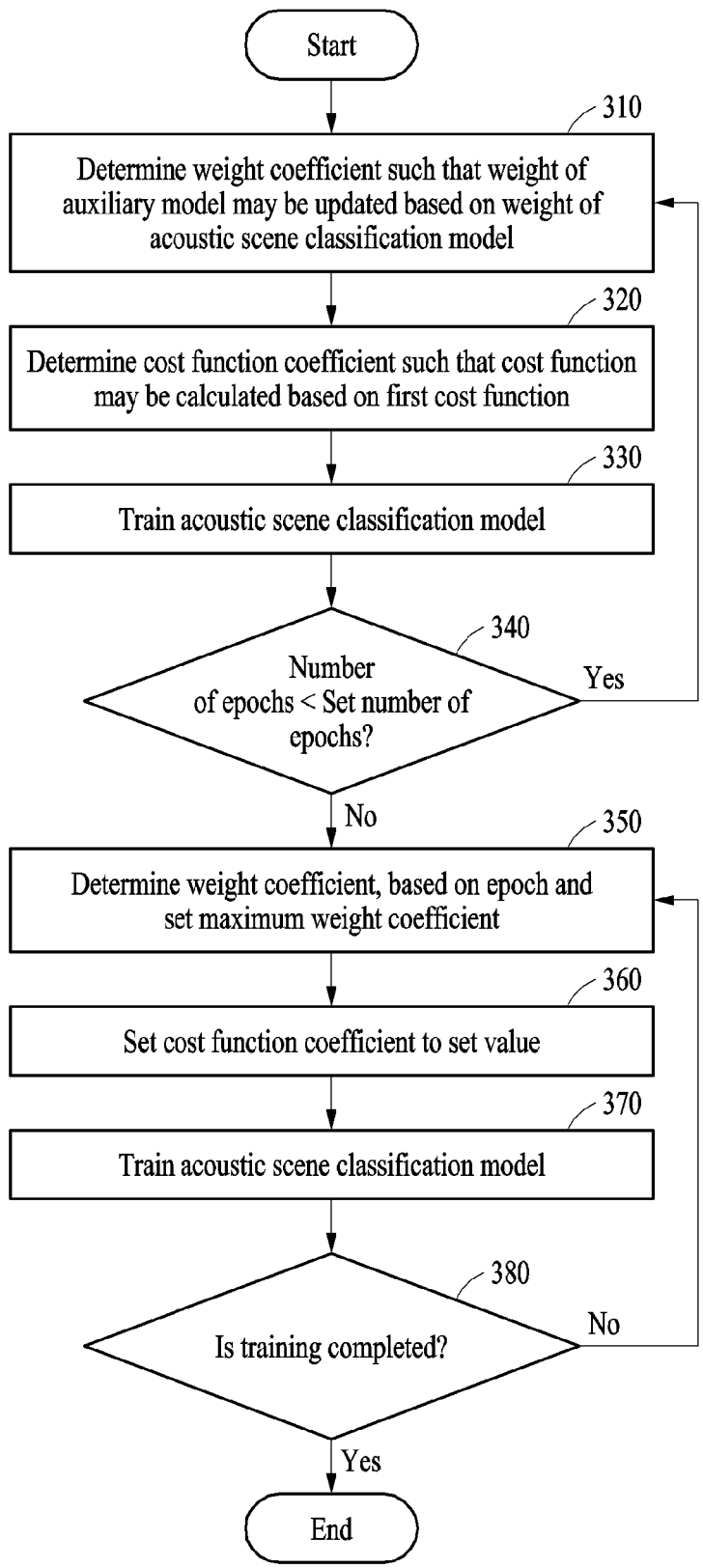
FIG. 3 is a diagram illustrating a whole training process of the acoustic scene classification model according to an example embodiment.

FIG. 3 is a diagram illustrating a whole training process of the acoustic scene classification model 110 according to an example embodiment. Referring to FIG. 3, the electronic device 100 may train the acoustic scene classification model 110, without using the auxiliary model 120, in an epoch that is less than a set epoch.

For example, when the epoch is less than the set epoch, the electronic device 100 may train the acoustic scene classification model 110 without using the auxiliary model 120. For example, when training the acoustic scene classification model 110 in an epoch that is less than the set epoch, the electronic device 100 may determine a weight coefficient and a cost function coefficient such that the acoustic scene classification model 110 may be trained alone. For example, the electronic device 100 may train the acoustic scene classification model 110 without operating an ensemble-inducing model in an epoch that is less than the set epoch and may train the acoustic scene classification model 110 by operating the ensemble-inducing model in an epoch that is greater than or equal to the set epoch.

For example, training the acoustic scene classification model 110 alone in an epoch that is less than the set epoch may refer to updating a weight of the auxiliary model 120 to be the same as a weight of the acoustic scene classification model 110 and calculating a cost function by using the first cost function 130 calculated based on a difference between a first result and labeling of training data.

Referring to FIG. 3, in operation 310, the electronic device 100 may determine a weight coefficient such that the weight of the auxiliary model 120 may be updated based on the weight of the acoustic scene classification model 110.

For example, the electronic device 100 may update the weight of the auxiliary model 120, based on the weight of the acoustic scene classification model 110, by setting the weight coefficient α in Equation 1 to 1.

In operation 320, the electronic device 100 may determine a cost function coefficient such that a cost function may be calculated based on the first cost function 130.

For example, the electronic device 100 may calculate the cost function, based on the first cost function 130, by setting the cost function coefficient β in Equation 3 to 0.

In operation 330, the electronic device 100 may train the acoustic scene classification model 110. For example, in operation 330, the electronic device 100 may train the acoustic scene classification model 110 according to operations 210 to 250 illustrated in FIG. 2. For example, in operation 330, when the acoustic scene classification model 110 is trained once by using the training data 160, an epoch may increase by 1.

In operation 340, the electronic device 100 may compare an epoch with a set epoch. For example, the set epoch may refer to an interval where the acoustic scene classification model 110 is trained alone, for example, where an ensemble-inducing model does not operate.

For example, in operation 340, when the epoch is less than the set epoch, the electronic device 100 may perform operations 310 to 330. For example, whenever the electronic device 100 repeats operations 310 to 330, the epoch may increase by 1. The electronic device 100 may repeatedly perform operations 310 to 330 up until the epoch is greater than or equal to the set epoch.

In operation 340, when the epoch is greater than or equal to the set epoch, the electronic device 100 may determine a weight coefficient, based on the epoch and a set maximum weight coefficient. For example, the electronic device 100 may determine the weight coefficient based on Equation 2.

In operation 360, the electronic device 100 may set a cost function coefficient to a set value.

In operation 370, the electronic device 100 may train the acoustic scene classification model 110. For example, in operation 370, the electronic device 100 may train the acoustic scene classification model 110 according to operations 210 to 250 illustrated in FIG. 2. For example, in operation 370, when the acoustic scene classification model 110 is trained once by using the training data 160, an epoch may increase by 1.

In operation 380, the electronic device 100 may determine whether the training of the acoustic scene classification model 110 is completed. For example, the electronic device 100 may determine whether the training of the acoustic scene classification model 110 is completed by comparing an epoch with the set total number of training repetitions.

For example, when the training is not completed in operation 380, the electronic device 100 may train the acoustic scene classification model 110 according to operations 350 to 370.

For example, the electronic device 100 may set a learning rate differently in operations 330 and 370. For example, the electronic device 100 may freely set the learning rate in operation 330 while setting the learning rate in operation 370 to low. For example, the electronic device 100 may set a learning rate of training of which an epoch is greater than or equal to the set epoch to a greater value than a learning rate of training of which an epoch is less than the set epoch.

For example, the electronic device 100 may include a structure for training the acoustic scene classification model 110 by using the auxiliary model 120, based on supervised learning. The electronic device 100 may improve the performance of a model by using an effect caused by the auxiliary model 120, for example, by using an ensemble effect by an ensemble-inducing model. The electronic device 100 may effectively train the acoustic scene classification model 110 by training the acoustic scene classification model 110 alone in an epoch that is less than the set epoch as illustrated in FIG. 3.

Figure 4:
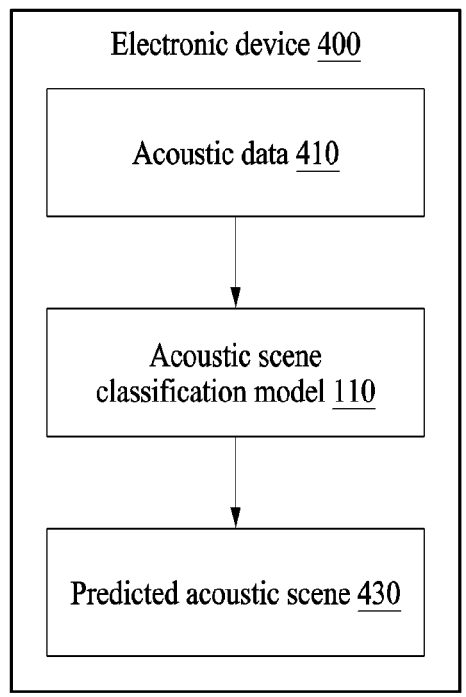
FIG. 4 is a diagram illustrating an operation of classifying an acoustic scene using an electronic device according to an example embodiment.

FIG. 4 is a diagram illustrating an operation of classifying an acoustic scene using an electronic device 400 according to an example embodiment.

Referring to FIG. 4, the electronic device 400 may identify acoustic data 410 including an acoustic scene. The electronic device 400 may input the acoustic data 410 to the acoustic scene classification model 110 and output a predicted acoustic scene 430.

In FIG. 4, the acoustic scene classification model 110 may be trained by using the auxiliary model 120 for inducing the training of the acoustic scene classification model 110. For example, the acoustic scene classification model 110 illustrated in FIG. 4 may be a neural network model trained according to the training method of the acoustic scene classification model 110 of the electronic device 100 illustrated in FIGS. 1, 2, and 3.

Figure 5:
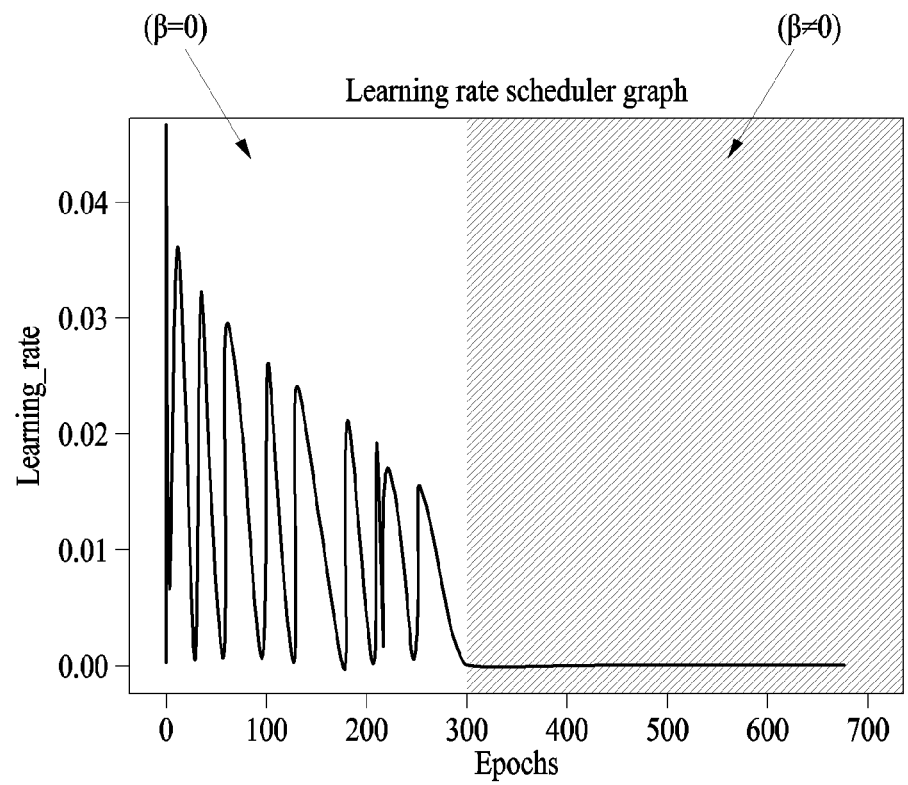
FIG. 5 is a diagram illustrating a cost function coefficient and a learning rate, based on an epoch, according to an example embodiment.

FIG. 5 is a diagram illustrating a cost function coefficient and a learning rate, based on an epoch, according to an example embodiment. FIG. 5 is a diagram illustrating an example of updating a weight of the auxiliary model 120, based on a weight of the acoustic scene classification model 110, in an epoch that is less than a set epoch and calculating a cost function, based on the first cost function 130, by the electronic device 100 described with reference to FIG. 3.

FIG. 5 is an example where the set epoch is 300, in which the electronic device 100 may calculate the cost function by setting the cost function coefficient β in Equation 3 to 0 in an epoch that is less than 300. The electronic device 100 may freely set a learning rate of the acoustic scene classification model 110 in an epoch that is less than 300.

For example, an epoch interval where the cost function coefficient β is 0 may be referred to as an ensemble-inducing model non-operation area, and an epoch interval where the cost function coefficient β is not 0 may be referred to as an ensemble-inducing model operation area. For example, the electronic device 100 may set a learning rate, to be constant, in the ensemble-inducing model operation area where the cost function coefficient β is not 0.

In another example different from the example illustrated in FIG. 5, the electronic device 100 may update the weight of the auxiliary model 120 by setting the weight coefficient α in Equation 1 to 1 in an epoch that is less than 300.

For example, the electronic device 100 may train the acoustic scene classification model 110 by setting the cost function coefficient β to 0 or the weight coefficient α to 1 in an epoch that is less than the set epoch.

For example, when the cost function coefficient β is 0, the cost function may be calculated by using the first cost function according to Equation 3. The electronic device 100 may update the weight of the acoustic scene classification model 110 to minimize the first cost function 130. Therefore, when the cost function coefficient β is 0, the acoustic scene classification model 110 may be trained alone.

For example, when the weight coefficient α is 1, the weight of the auxiliary model 120 may be updated to be the same as the weight of the acoustic scene classification model 110. Since the weight of the auxiliary model 120 is the same as the weight of the acoustic scene classification model 110, a first result may be the same as a second result and the second cost function 140 may be 0. Since the second cost function 140 is 0, the electronic device 100 may calculate the cost function according to the first cost function 130, and when the weight coefficient α is 1, the acoustic scene classification model 110 may be trained alone.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single example embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A training method of an acoustic scene classification model, the training method comprising:

inputting training data, via a processor, labeled as an acoustic scene to the acoustic scene classification model that is repeatedly trained, via the processor, by using the training data and outputting a first result, via the processor, predicting the acoustic scene;

based on a weight of the acoustic scene classification model in a current epoch and a weight of an auxiliary model in a previous epoch, updating the weight, via the processor, of the auxiliary model configured to induce training, via the processor, of the acoustic scene classification model;

inputting the training data, via the processor, to the auxiliary model and outputting a second result via the processor;

based on the first result, the second result, and the labeling of the training data, calculating a cost function via the processor; and based on the cost function, updating the weight, via the processor, of the acoustic scene classification model, wherein the updating the weight, via the processor, of the auxiliary model comprises;

based on a reflection ratio of the weight of the acoustic scene classification model in a current epoch and the weight of the auxiliary model in a previous epoch, wherein the reflection ratio is determined based on a weight coefficient, updating the weight, via the processor, of the auxiliary model by the equation;

$$\theta_{ema} \leftarrow (1-\alpha)\theta_{ema} + \alpha\theta$$

wherein $\theta_{ema}$ denotes the weight of the auxiliary model, $\theta$ denotes the weight of the acoustic scene classification model, and α denotes the weight coefficient, where, $\theta_{ema}$ on the right of the equation is the weight of the auxiliary model in a previous epoch and $\theta_{eema}$ on the left of the equation is the weight, to be updated, of the auxiliary model, wherein (1−α) is a reflection ratio of the weight of the auxiliary model in a previous epoch, and the weight coefficient α is a reflection ratio of the weight of the acoustic scene classification model, and wherein the weight coefficient α is defined by the equation;

$$\alpha = \min(1 - 1/n + 1, \alpha_{max})$$

wherein, $\alpha_{max}$ denotes the set maximum weight coefficient, n denotes an epoch, and min (a, b) denotes a smaller value between a and b, and wherein the weight coefficient α is determined to be a smaller value between 1−1/n+1 that is determined based on an epoch and the set maximum weight coefficient $\alpha_{max}$.

2. The training method of claim 1, wherein
the updating the weight, via the processor, of the auxiliary model comprises:
as the weight coefficient increases, by increasing the reflection ratio, via the processor, of the weight of the acoustic scene classification model and decreasing the reflection ratio, via the processor, of the weight of the auxiliary model in a previous epoch, updating the weight, via the processor, of the auxiliary model.

3. The training method of claim 1, wherein
the updating the weight, via the processor, of the auxiliary model comprises:
as an epoch increases by 1, increasing the weight coefficient, via the processor, up until the weight coefficient is less than or equal to a set maximum weight coefficient.

4. The training method of claim 1, wherein
the updating the weight, via the processor, of the auxiliary model comprises:
when the number of epochs is less than a set number of epochs that is set to train, via the processor, the acoustic scene classification model alone, determining the weight coefficient, via the processor, such that the weight of the auxiliary model is updated based on the weight of the acoustic scene classification model.

5. The training method of claim 1, wherein
the outputting the first result, via the processor, comprises:
adding noise to the training data, via the processor, and inputting the noise-added training data, via the processor, to the acoustic scene classification model.

6. The training method of claim 1, wherein
the calculating the cost function, via the processor, comprises:
calculating a first cost function, via the processor, by using the first result and the labeling of the acoustic scene;
calculating a second cost function, via the processor, by using the first result and the second result; and
multiplying the second cost function, via the processor, by a cost function coefficient and adding the first cost function, via the processor, to the second cost function multiplied by the cost function coefficient via the processor, by the equation:

$$C(\theta) = C_{class}(\theta) + \beta C_{consist}(\theta)$$

wherein $C(\theta)$ denotes the cost function, $C_{class}(\theta)$ denotes the first cost function, β denotes the cost function coefficient, and $C_{consist}(\theta)$ denotes the second cost function.

7. The training method of claim 6, wherein
the calculating the cost function, via the processor, comprises:
when the number of epochs is less than a set number of epochs that is set to train, via the processor, the acoustic scene classification model alone, determining the cost function coefficient, via the processor, such that the cost function is calculated based on the first cost function via the processor.

8. A method of classifying an acoustic scene, the method comprising:
identifying acoustic data, via a processor, comprising the acoustic scene; and
inputting the acoustic data to an acoustic scene classification model, via the processor, that is trained and predicting the acoustic scene via the processor, wherein
the acoustic scene classification model is trained, via the processor, by using an auxiliary model configured to induce training of the acoustic scene classification model,
wherein
the acoustic scene classification model is trained, via the processor, by
inputting training data, via the processor, labeled as the acoustic scene to the acoustic scene classification model that is repeatedly trained, via the processor, by using the training data and outputting a first result, via the processor, predicting the acoustic scene,
updating a weight of the auxiliary model, via the processor, based on a weight of the acoustic scene classification model in a current epoch and a weight of the auxiliary model in a previous epoch,
inputting the training data, via the processor, to the auxiliary model and outputting a second result via the processor,
calculating a cost function, via the processor, based on the first result, the second result, and labeling of the training data, and
updating the weight of the acoustic scene classification model via the processor, based on the cost function, and
wherein the cost function is calculated, via the processor, by the equation;

$$C(\theta) = C_{class}(\theta) + \beta C_{consist}(\theta)$$

wherein $C(\theta)$ denotes the cost function, $C_{class}(\theta)$ denotes a first cost function, β denotes a cost function coefficient, and $C_{consist}(\theta)$ denotes a second cost function.

9. An electronic device comprising:
a processor, wherein
the processor is configured to identify acoustic data comprising an acoustic scene, input the acoustic data to an acoustic scene classification model that is trained, and predict the acoustic scene, wherein
the acoustic scene classification model is trained, via the processor, by using an auxiliary model configured to induce training of the acoustic scene classification model,
wherein
the acoustic scene classification model is trained, via the processor, by
inputting training data, via the processor, labeled as the acoustic scene to the acoustic scene classification model that is repeatedly trained by using the training data and outputting a first result predicting the acoustic scene, updating a weight of the auxiliary model, via the processor, based on a weight of the acoustic scene classification model in a current epoch and a weight of the auxiliary model in a previous epoch, inputting the training data, via the processor, to the auxiliary model and outputting a second result via the processor, calculating a cost function, via the processor, based on the first result, the second result and labeling of the training data, and updating the weight of the acoustic scene classification model via the processor, based on the cost function, and wherein the cost function is calculated, via the processor, by the equation:

$$C(\theta) = C_{class}(\theta) + \beta C_{consist}(\theta)$$

wherein $C(\theta)$ denotes the cost function, $C_{class}(\theta)$ denotes a first cost function, $\beta$ denotes a cost function coefficient, and $C_{consist}(\theta)$ denotes a second cost function.

10. The electronic device of claim 9, wherein
the weight of the auxiliary model is
updated, via the processor, based on a reflection ratio of the weight of the acoustic scene classification model in a current epoch and the weight of the auxiliary model in a previous epoch, wherein the reflection ratio is determined, via the processor, based on a weight coefficient.

11. The electronic device of claim 10, wherein
the weight of the auxiliary model is
updated, via the processor, as the weight coefficient increases by increasing the reflection ratio of the weight of the acoustic scene classification model and decreasing the reflection ratio of the weight of the auxiliary model in a previous epoch.

12. The electronic device of claim 10, wherein
the weight coefficient increases as an epoch increases by 1 until the weight coefficient is less than or equal to a set maximum weight coefficient.

13. The electronic device of claim 10, wherein
the weight coefficient, when the number of epochs is less than a set number of epochs that is set to train the acoustic scene classification model alone, via the processor, is determined such that the weight of the auxiliary model is updated based on the weight of the acoustic scene classification model.

14. The electronic device of claim 9, wherein
the first result is output, via the processor, by inputting the training data to which noise is added to the acoustic scene classification model.

15. The electronic device of claim 9, wherein
the cost function is
calculated by calculating the first cost function, via the processor, by using the first result and the labeling of the acoustic scene, calculating the second cost function, via the processor, by using the first result and the second result, multiplying the second cost function, via the processor, by the cost function coefficient, and adding the first cost function, via the processor, to the second cost function multiplied by the cost function coefficient.

16. The electronic device of claim 15, wherein
the cost function is calculated, via the processor, based on the first cost function when the number of epochs is less than a set number of epochs that is set to train the acoustic scene classification model alone.

* * * * *